US008936228B2

(12) United States Patent
Sayre et al.

(10) Patent No.: US 8,936,228 B2
(45) Date of Patent: Jan. 20, 2015

(54) LOAD ISOLATION BRACKET

(75) Inventors: Jeffrey Paul Sayre, Naperville, IL (US); Shrikrishna Madhav Kulkarni, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 254 days.

(21) Appl. No.: 13/462,448

(22) Filed: May 2, 2012

(65) Prior Publication Data

US 2013/0291679 A1 Nov. 7, 2013

(51) Int. Cl.
*F16M 1/00* (2006.01)

(52) U.S. Cl.
USPC ............ 248/638; 248/560; 248/674; 248/300

(58) Field of Classification Search
CPC ........... E02F 9/058; E02F 9/24; E02F 9/2267; B21D 39/03
USPC ......... 248/638, 200, 300, 560, 637, 674, 635; 74/608
See application file for complete search history.

(56) References Cited

U.S. PATENT DOCUMENTS

| | | | | |
|---|---|---|---|---|
| 1,371,622 | A * | 3/1921 | Hudson | 248/675 |
| 1,635,847 | A * | 7/1927 | Hooper | 248/675 |
| 2,819,113 | A * | 1/1958 | Phillips | 294/87.1 |
| 3,388,884 | A * | 6/1968 | Eggler et al. | 248/222.11 |
| 4,097,012 | A | 6/1978 | McIntyre | |
| 6,230,585 | B1 | 5/2001 | Bator | |
| 6,612,528 | B2 | 9/2003 | Collins et al. | |
| 6,766,992 | B1 * | 7/2004 | Parker | 248/300 |
| 7,017,788 | B2 * | 3/2006 | Trambley et al. | 224/326 |
| 7,339,549 | B2 * | 3/2008 | Maxwell | 343/892 |
| 7,510,163 | B2 | 3/2009 | Schlitzkus et al. | |
| 7,810,466 | B2 | 10/2010 | Preimesberger et al. | |
| 7,918,433 | B2 | 4/2011 | Melton et al. | |
| 2001/0032909 | A1 * | 10/2001 | Goettle | 248/58 |
| 2009/0166486 | A1 * | 7/2009 | Sugiyama et al. | 248/200 |
| 2009/0267276 | A1 | 10/2009 | Sugimoto et al. | |
| 2013/0313398 | A1 * | 11/2013 | Sayre et al. | 248/636 |

* cited by examiner

*Primary Examiner* — Anita M King
(74) *Attorney, Agent, or Firm* — Miller, Matthias & Hull

(57) ABSTRACT

A load isolating device may be defined by a plate-style bracket having a planar body and a plurality of tabs arranged about the body. Each tab may define a peripheral extremity of the body, extending outwardly thereof and situated substantially within the same plane as the body. Each tab may have a particular width, and may include a neck defined by a fillet having a predetermined radius, both tab width and fillet radius being sized and configured to absorb load forces through elastic deformation. As such, the tabs may elastically deform under load to minimize any deformation of the planar body of the device, which in the disclosed embodiment may be formed of an elastic metal plate. Each tab may have the same thickness as the planar body, and both the tabs and the planar body of the device may comprise the same material.

19 Claims, 3 Drawing Sheets

LOAD ISOLATION BRACKET

TECHNICAL FIELD

This disclosure relates to a protective device adapted to shield internal elements of a working component from potentially damaging operating force loads otherwise imparted to the component by a structural member of an associated machine, and more particularly to a bracket designed to isolate an attached component from such transient loads.

BACKGROUND

The protection of operating components, including hydraulic valves, is a common consideration in design and manufacture of machines, including, for example, trucks, construction equipment, excavators, wheel loaders, tractors, motor graders, mining machines and the like, on or in which such components may be secured. For example, a machine may impose transient and/or twisting loads on attached components at a level sufficient to bind or restrict movement of internal parts contained within the components.

In the case of a hydraulic valve component, an internal valve spool normally free to move reciprocally within the valve component may become damaged or bound by machine forces, rendering the component at least sporadically inoperable, i.e. causing desired movement of the valve spool to cease. Prior efforts directed to avoiding such component interference, as especially associated with off-road machines subject to particularly harsh loads, have involved using various isolating devices, including so-called isolation mounts incorporating rubber bushings. Such structures are, however, associated with greater complexity and assembly requirements, considering that, apart from the extra expense, the rubber parts must be separately manufactured and inventoried.

SUMMARY OF THE DISCLOSURE

In accordance with one aspect of the disclosure, a protective load isolating device may include a planar body having a plurality of tabs arranged about the body. Each tab may define a peripheral extremity of the body, extending outwardly thereof though substantially situated within the same plane of the body. Each tab may have a particular width, and a neck defined by a fillet having a predetermined radius. Both the tab width and fillet radius may be adjusted for desired amount of deformation of the tab relative to the body.

In accordance with another aspect of the disclosure, the predetermined fillet radius of each neck may be sized and configured to absorb load forces through elastic deformation, such that the tabs may elastically deform and thus minimize any deformation within the planar body of the device.

In accordance with another aspect of the disclosure, the device may be formed of an elastic metal plate, and each tab may have the same thickness as the planar body.

In accordance with yet another aspect of the disclosure, both the tabs and the planar body may comprise a metal material, and the planar body may include a plurality of attachment apertures adapted for direct securement to the housing of a component adapted to be protected or shielded from work machine load forces.

DETAILED DESCRIPTION

Figure 1:
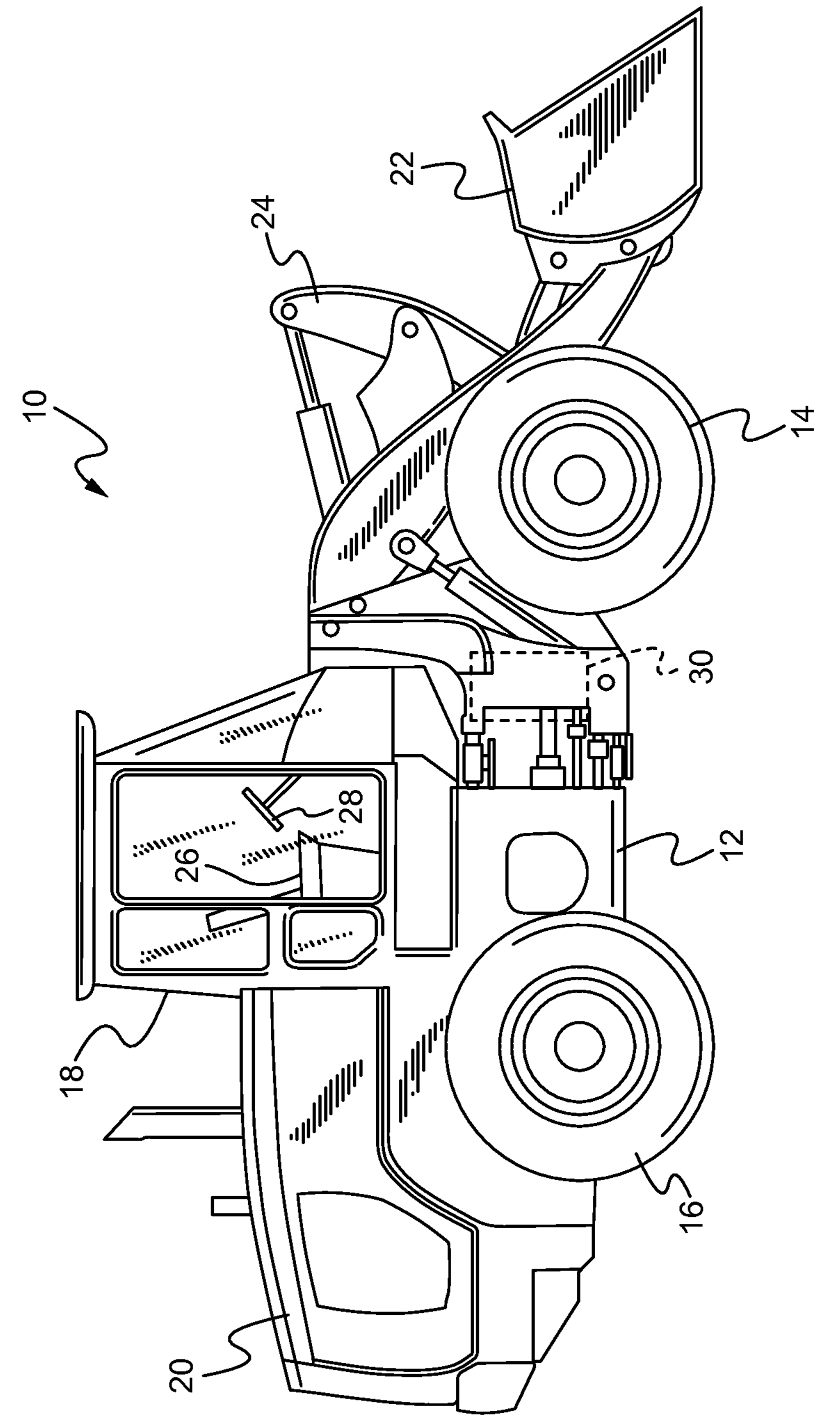
FIG. 1 is a side elevational view of a machine that incorporates the disclosed embodiment of a load isolating device.

Referring initially to FIG. 1, a machine 10, such as a wheel loader as depicted, includes a main frame 12, front wheels 14, and rear wheels 16. By way of example only, the machine 10 may also include a centrally positioned operator cab 18, and an engine compartment 20 positioned at the rear end of the machine 10, and/or immediately behind the cab 18. The engine compartment 20 may contain an engine (not shown) for propelling the machine 10, as well as for manipulating a functional shovel, bucket, or other tool 22, shown at the front end of the machine 10.

The bucket 22 may be affixed to and directly operable by hydraulic linkage apparatus 24, as may be controlled by a machine operator (not shown) seated within the cab 18. Thus a seat 26, as well as controls 28 including a steering wheel as shown, may be utilized by such machine operator. The machine 10 may be adapted to perform work tasks, such as the movement of dirt and debris, for example.

Finally, a machine component, such as a spool valve assembly 30 by way of example, may be adapted for manipulation of the bucket 22 via the hydraulic linkage apparatus 24. Such work task movements of the machine 10 may be associated with significant transient operating force loads, particularly during actual digging into soil and/or the raising and lowering buckets of dirt. As such, the spool valve assembly 30 may bind up and become inoperative if not isolated from such transient force loads otherwise imposed thereon during operation of the machine 10.

Figure 2:
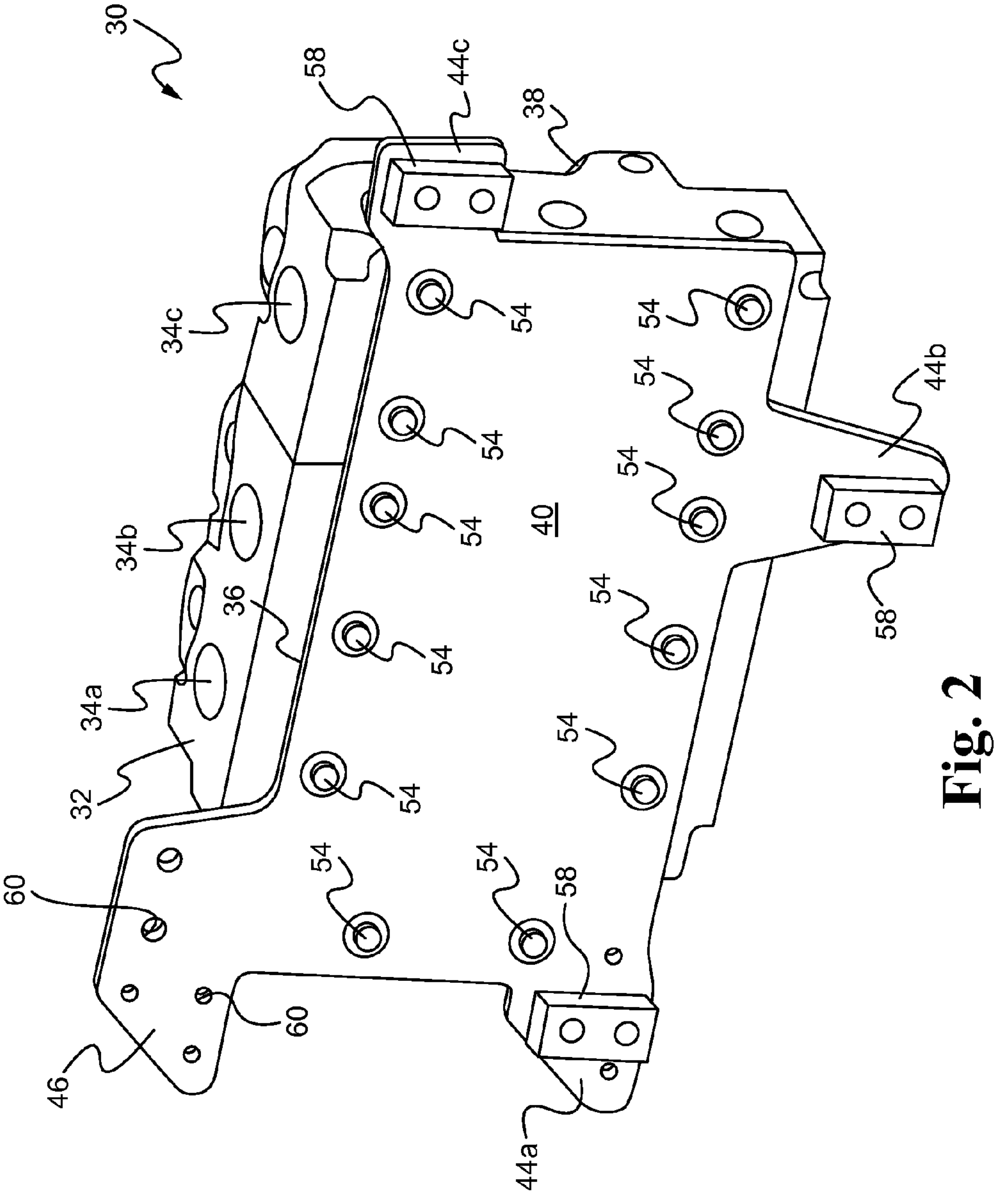
FIG. 2 is a perspective view of a machine component shown secured directly to the disclosed load isolating device.
Figure 3:
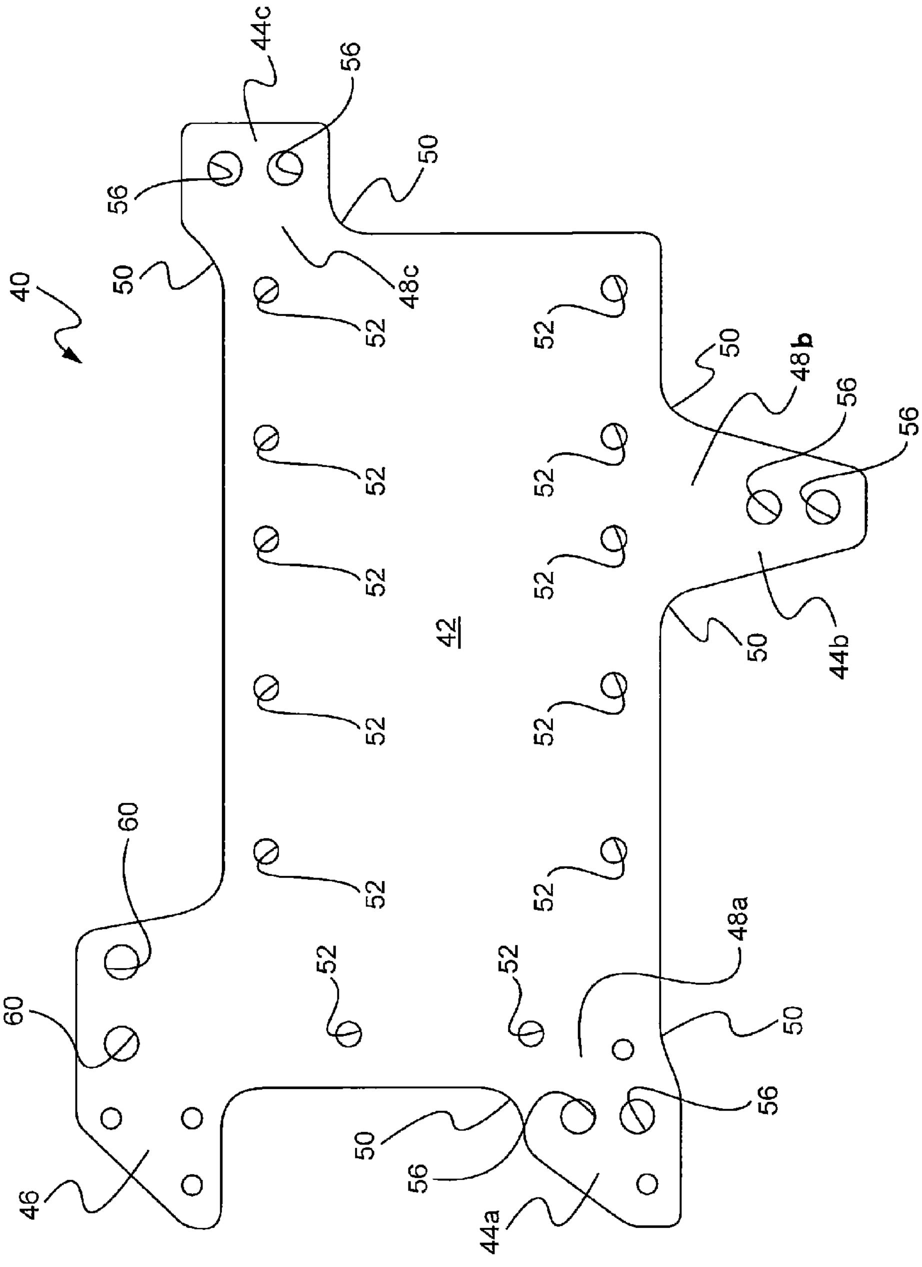
FIG. 3 is a plan or face view of the disclosed load isolating device.

Referring now to FIGS. 2 and 3, an exemplary component that may be protected from transient force loads may be a spool valve assembly 30. The spool valve assembly 30 may incorporate a spool valve body 32 containing individual spool valves (not shown) that move within parallel axial passages 34*a*, 34*b*, and 34*c* within the valve body 32. Each spool valve may be adapted to move reciprocally within one of the passages, as may be appreciated by those skilled in the art. With respect to the orientation of the machine 10, the spool valve body 32 may have an outwardly-facing supported side 36, as well as an inwardly-facing unsupported side 38. The supported side 36 of the spool valve body 32 may include a plurality of threaded apertures oriented transversely to the axial passages 34 to accommodate securement of a protective, load-isolating, mounting bracket 40 to the spool valve body 32, as shown.

Referring now more particularly to FIG. 3, the bracket 40 may be formed of any sufficiently strong and durable elastic material, including metal, to define a central planar body 42. Although only metal materials are described herein, it is envisioned that the bracket 40 could also be formed of a plastic composite material having sufficient strength, durability and yield, for example. Moreover, even though described herein as planar, the body 42 may be described as being substantially planar to allow for some adaptation to a particular machine configuration, for example.

Mounting tabs 44*a*, 44*b*, and 44*c* may extend about the boundary of the body 42. The mounting tabs may be adapted to be secured to the main frame 12 (FIG. 1) of the machine 10. An auxiliary tab 46 may be provided for other purposes, including the support of an electrical power supply unit (not shown). Additional auxiliary tabs may be employed, although not utilized nor depicted in the disclosed embodiment.

Each of the mounting tabs 44*a*, 44*b*, and 44*c* may include a neck portion 48*a*, 48*b*, and 48*c*, by which it is connected to the planar body portion 42. Each neck portion 48 may have a pair of fillets 50 of differing sizes about the body 42. In alternate embodiments, and within the scope of this disclosure, a neck portion 48*a*, 48*b*, and 48*c* may be configured with one or more fillets 50. Each fillet 50 may have a predetermined radius and configured to best absorb load forces through elastic deformation. The sizing and configuration of the tabs 44*a*, 44*b*, and 44*c* and fillets 50 may be achieved via finite element analysis, although other methodologies may be employed within the scope of this disclosure.

The tabs may therefore be designed to elastically deform under transient force loads, and in a manner that minimizes deformation of the planar body 42, to protect any component, as the spool valve 30, for example, that may be attached to the mounting bracket 40.

Making continued reference to FIGS. 2 and 3, a plurality of component attachment apertures 52, as well as component attachment bolts 54, may be employed to rigidly secure the body 32 of the spool valve 30 to the bracket 40. In addition, mounting apertures 56 may provide for securement via spacer pads (also called spacers) 58 to the main frame 12 of the work machine 10. As such, the spacer pads 58, which may be welded to the main frame 12, may provide the points of attachment for the three mounting tabs 44*a*, 44*b*, and 44*c*. The spacer pads 58, which may be formed of any strong and durable material including metal as described herein, may be adapted to space the spool valve 30 and bracket 40 from direct contact with the main frame 12. Further, the spacer pads 58, in concert with the tabs 44, may be adapted to isolate and/or attenuate transient force loads from the spool valve 30.

The use of only three mounting tabs 44 and three points of attachment as depicted, rather than four or more, for example, may better assure that the connection points will all lie within the same plane. Moreover, the use of three mounting tabs 44, in combination with the spacers 58, may provide for substantial isolation of any component attached to the bracket 40 almost as effectively as the use of isolation mounts utilizing rubber bushings.

Finally, auxiliary tab apertures 60 may accommodate other unrelated connections, including an electrical power supply unit, for example.

INDUSTRIAL APPLICABILITY

The described protective load isolation device may be useful in a variety of machines, including wheel loaders, excavators, tractors, trucks, and other off-road machines. As disclosed, the load isolation mounting bracket 40 may replace isolation brackets that incorporate rubber bushings as part of their mounting structure.

In operation, the mounting bracket 40 may be adapted to protect operational components, such as the spool valve assembly 30, whenever linear, torsional, which or other transient force loads may otherwise be transferred from the main frame 12 of the machine 10 to the component.

A method of isolating a component in accordance with the disclosure may include step of forming a bracket having a planar body and a plurality of machine mounting tabs extending from the body, each of the tabs being substantially within the same plane of the body, the body containing a first set of apertures, the tabs containing a second set of apertures. The method may further include the steps of forming a spacer corresponding to each tab for securement to the machine, attaching the spacer directly to the machine, attaching the bracket to the component utilizing the first set of apertures, and attaching each of the tabs to one of the spacers utilizing the second set of apertures. Further, each of the tabs may be sized and configured to absorb transient force loads that may be imposed from the machine to the component, thereby avoiding binding of or damage to any moving element within the component.

What is claimed is:

1. A protective device for attachment to a frame of a transient force load producing machine to isolate transient force loads from direct transfer to an operating component attached to the protective device, the protective device comprising:

a planar body;

a plurality of tabs extending outwardly from the body and substantially within the same plane of the body, each tab including a first side adapted for attachment to the frame;

each tab joined to the body by a neck extending between opposed fillets having respective radii to define a neck width, the radii and each neck width being sized to elastically deform the tab under the transient force loads; and a pad coupled to the first side of each tab, each pad being disposed between the first side of the tab and the frame, and sized to space the body from the frame sufficiently to permit elastic deformation of the tabs.

2. The protective device of claim 1, wherein the protective device comprises a unitary elastic metal plate, and wherein the each tab comprises substantially the same thickness as the planar body.

3. The protective device of claim 2, wherein both the tabs and the body of the device comprise a metal material.

4. The protective device of claim 3, wherein the planar body includes a plurality of attachment apertures adapted for direct attachment to a component.

5. The protective device of claim 1, in which the plurality of tabs consists of three tabs.

6. The protective device of claim 1, in which the planar body defines a boundary, and each tab extends outwardly from the boundary of the planar body.

7. The protective device of claim 1, in which the component comprises a valve assembly coupled to a side of the planar body opposite the first sides of the tabs.

8. A protective bracket for attachment to a frame of a transient force load producing machine to isolate transient force loads from reaching an operating component attached to the protective bracket, the protective bracket comprising:

a planar body;

a plurality of tabs extending outwardly from the body and substantially within the same plane of the body, each tab including a first side adapted for attachment to the frame;

each tab joined to the body by a neck extending between opposed fillets having respective radii to define a neck width, the radii and each neck width being sized to elastically deform the tab under the transient force loads; and a pad coupled to the first side of each tab, each pad being disposed between the first side of the tab and the frame, and sized to space the body from the frame sufficiently to permit elastic deformation of the tabs.

9. The protective bracket of claim 8, wherein the protective bracket comprises a unitary elastic metal plate, and wherein the each tab comprises substantially the same thickness as the planar body.

10. The protective bracket of claim 9, wherein both the tabs and the body of the bracket comprise a metal material.

11. The protective bracket of claim 10, wherein the planar body includes a plurality of attachment apertures adapted for direct attachment to a component.

12. The protective bracket of claim 8, in which the plurality of tabs consists of three tabs.

13. The protective bracket of claim 8, in which the planar body defines a boundary, and each tab extends outwardly from the boundary of the planar body.

14. The protective bracket of claim 8, in which the component comprises a valve assembly coupled to a side of the planar body opposite the first sides of the tabs.

15. A method of isolating and protecting a component containing moving parts from structural loads that may be imposed thereon by a machine to which the component is attached, the method comprising:

forming a bracket with:

a planar body;

a plurality of mounting tabs extending outwardly from the body, each of the tabs being substantially within the same plane of the body, each tab including a first side adapted for attachment to the machine;

a neck joining each tab to the body, each neck extending between two opposed fillets having respective radii to define a neck width, the radii and each neck width being sized to elastically deform under the structural loads;

a first set of apertures in the body; and a second set of apertures in the tabs;

coupling a pad to the first side of each tab, each pad being disposed between the first side of the tab and the frame, and sized to space the body from the machine sufficiently to permit elastic deformation of the tabs;

attaching each pad directly to the machine;

attaching the component to the bracket with the first set of apertures;

attaching each of the tabs to one of the pads with the second set of apertures; and automatically deforming each tab in response to the structural loads.

16. The method of claim 15, wherein each pad is a rigid member.

17. The method of claim 16, wherein forming the bracket comprises forming three mounting tabs.

18. The method of claim 17, wherein the body, the tabs, and the pads, are integrally formed.

19. The method of claim 18, wherein the body and the tabs are of the same thickness.

* * * * *